Oct. 28, 1958　　F. J. KENT ET AL　　2,858,017
DIE SHIFTING AND EXTRUSION CUTTING SLIDE
Filed April 5, 1954　　2 Sheets-Sheet 1
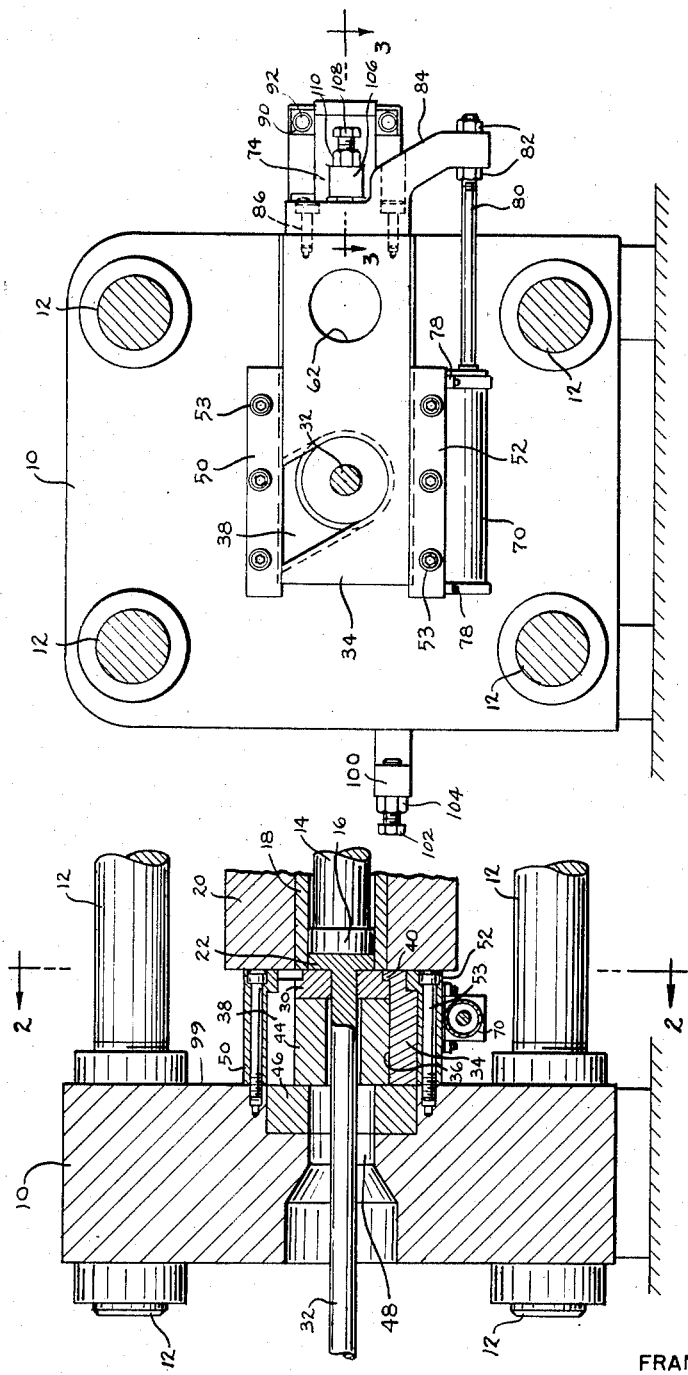
INVENTORS
FRANCIS J. KENT
BY RAYMOND F. BOSHOLD
AGENT Oct. 28, 1958  F. J. KENT ET AL  2,858,017
DIE SHIFTING AND EXTRUSION CUTTING SLIDE
Filed April 5, 1954  2 Sheets-Sheet 2

INVENTORS
FRANCIS J. KENT
BY RAYMOND F. BOSHOLD

AGENT

United States Patent Office 2,858,017
Patented Oct. 28, 1958

2,858,017

DIE SHIFTING AND EXTRUSION CUTTING SLIDE

Francis J. Kent, New York, and Raymond F. Boshold, Seaford, N. Y., assignors, by mesne assignments, to Baldwin-Lima-Hamilton Corporation, Philadelphia, Pa., a corporation of Pennsylvania Application April 5, 1954, Serial No. 420,940

2 Claims. (Cl. 207—1)

This invention relates to metal extrusion presses for the extrusion of solid and hollow material from light metals, copper, brass and the like.

Particularly, the invention relates to metal extrusion presses of the type in which the platen has an opening therethrough and a member such as a slide cooperating with the die is movable across the platen opening to an operative position and an inoperative position. In the operative position, the die and a passage in the slide register with the platen opening so that a heated billet may be extruded therethrough. The slide carries cutting means and when it is shifted to its inoperative position after extrusion, the extruded material may be severed from residue of metal in the die. The inoperative position serves for removal of residue of metal and cleaning or changing of the die.

An auxiliary passage may be provided in the die slide to register with the platen opening in the inoperative position of the slide and permit removal of unextruded metal from the container of the press, particularly in the case of a billet which has cooled down to such an extent that it cannot be extruded through the die.

In presses of the above type as designed heretofore, one single actuating means such as a double-acting hydraulic cylinder and piston unit has been provided for shifting the die slide to its various positions, as well as for cutting the extruded material. Considerable force is required to cut large extruded shapes, and the hydraulic motor should preferably act approximately centrally upon the cutting means; further, the necessary shifting movement from operative to inoperative position and vice versa is of considerable length. Therefore, a large cylinder and piston unit of relatively long stroke has been required, the unit projecting from the press laterally through a substantial distance. This has obstructed movement of material around the press and rendered operation of the machine difficult. At the same time, the consumption of hydraulic pressure fluid has been considerable when using the same large cylinder for cutting motions and for idle shifting movements.

It is an object of the present invention to provide an improved press construction which avoids the above disadvantages and facilitates operation of the press, resulting in a larger output of extruded products.

Another object of the invention is to reduce the power consumption required for operation of the press.

It is a further object of the invention to provide an extrusion press in which a first actuating means serves for shifting the die-supporting member or slide from one position to another position and a second actuating means cooperates with the first actuating means during the cutting of extruded material.

It is also an object of the invention to provide an extrusion press in which the die-supporting member or slide is shifted by a first actuating means connected thereto and during the cutting of extruded material is contacted by a second actuating means cooperating with the first actuating means.

Various other objects and advantages of the invention will become apparent as the description proceeds.

In the drawings which show a preferred embodiment of the invention,

Fig. 1 is a diagrammatic fragmentary, longitudinal sectional elevation of an extrusion press embodying the invention, the parts being shown in their operative positions.

Fig. 2 is a section taken along line 2—2 of Fig. 1.

Figure 4:
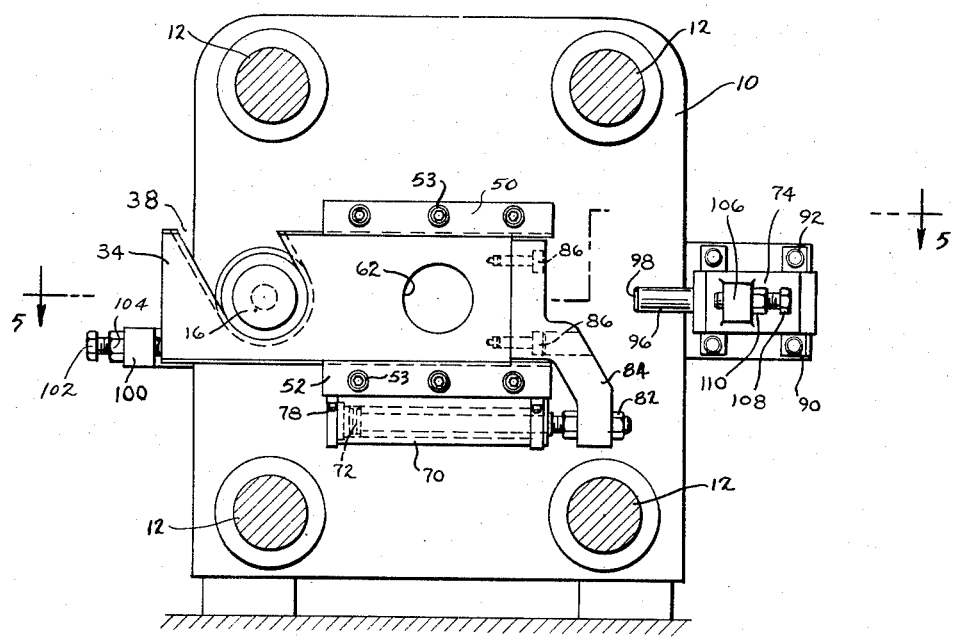
Fig. 4 is a section taken along line 4—4 of Fig. 5 and showing various parts in their inoperative positions.

Referring to the drawings, the horizontal hydraulic extrusion press illustrated therein comprises a platen 10 which is connected by tie-rods 12 to a main hydraulic cylinder (not shown). The latter serves for moving an extrusion stem 14 and pressing disc or dummy block 16 to act upon a heated billet inserted into liner 18 of container 20. In the position shown in Fig. 1, the billet has been extruded except for the usual butt end 22.

A die 30 serves to shape the extruded metal 32 and cooperates with a slide 34 having a passage 36 therein. In the embodiment shown, the die is inserted in passage 36 and carried by the slide. Passage 36 is open towards the top of the slide as indicated at 38, the opening being preferably inclined to facilitate insertion and removal of the die. As indicated at 40, cooperating shoulders of the slide and die serve to retain the die in the slide, the die bearing against an annular member or bolster 44. Instead of this arrangement, the die may be inserted into liner 18 and bear against a bolster extending through the entire depth of passage 36 in the slide as is well known in the art.

Bolster 44 bears against an annular member or ring 46 inserted in a stepped opening 48 of the platen. Slide 34 is movable across opening 48 and guided by an upper guide member 50 and a lower guide member 52 attached to platen 10 by means of screws 53.

After an extrusion operation, container 20 is moved away from the die (see Fig. 5) by means of auxiliary cylinders (not shown). The extruded material may be severed from residue of metal in the die by means of bolster 44 and ring 46 which have cooperating cutting edges 54 and 56, respectively. Such procedure is desirable in particular when extruding hollow material through a spider or porthole die from which residue of metal cannot readily be withdrawn. The cut is performed while slide 34 is shifted to its inoperative position shown in Figs. 4 and 5, the severed parts being indicated at 58 and 60.

Figure 5:
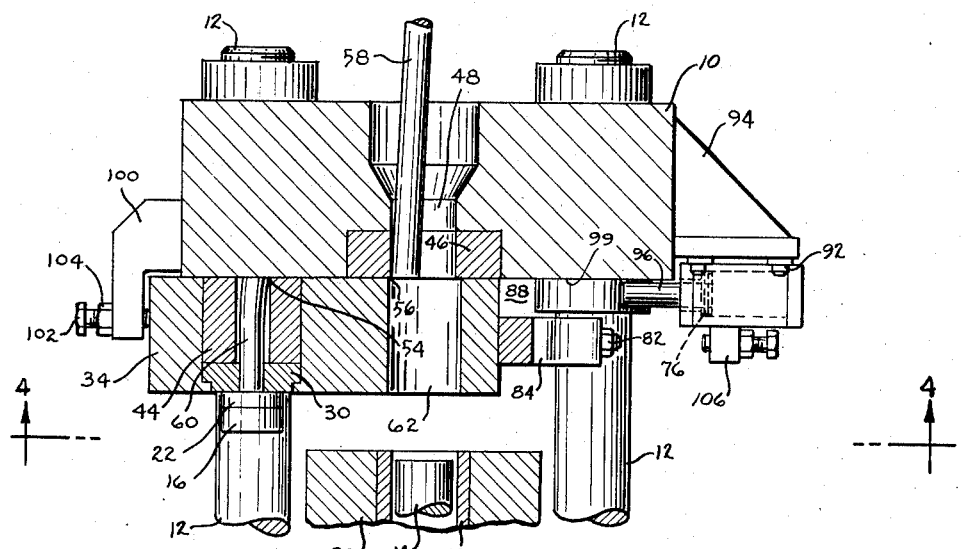
Fig. 5 is a section taken along line 5—5 of Fig. 4.

In the inoperative position, the die with the severed portion 60 can easily be removed from the slide and replaced by another die, the extruded rod or shape 58 being retracted to the rear of the press. As shown in Fig. 5, the dummy 16 usually adheres to the butt 22 and may be removed from the press together with the die. Alternatively, the butt 22 with the dummy adhering thereto may be sheared off between container and die along the face of the die in conventional manner, before slide 34 is shifted, and parts 58 and 60 may then be severed during shifting of the slide.

An auxiliary passage 62 of the die slide may register in the inoperative position with opening 48 of the platen to allow removal of an unextruded billet from the container in case of a so-called sticker, that is, a billet which has cooled down below the extrusion temperature.

If, as mentioned hereinbefore, a single hydraulic motor is used for shifting the die slide to its two positions and for cutting the extruded material, the stroke and capacity of the motor must be relatively large and since the motor should act substantially centrally upon the cutting means, it will protrude from the press laterally to an extent such that it will form an objectionable obstruction to the handling of material and will impair the operation of the machine.

In accordance with the embodiment of the invention shown in the drawings, a first actuating means comprising a double-acting cylinder 70 and piston 72 serves for shifting the slide to its two positions, and a second actuating means comprising a cylinder 74 and piston 76 cooperates with the first actuating means for cutting extruded material. Since a relatively small force is required for idle shifting movements of the slide, a shifting motor of correspondingly small capacity is sufficient so that the double-acting cylinder 70 may be of a standard pneumatic type if desired. Furthermore, the relatively small shifting force required can readily be applied to the slide in an eccentric manner without causing jamming of the slide. Thus motor 70, 72 may be arranged parallel to and alongside of the rectilinear path of slide 34 without substantially protruding from the press.

As shown in the drawings, the double-acting cylinder 70 is fastened to lower guide member 52 by screws 78. Piston rod 80 has nuts 82 on its threaded end for connection to an arm 84 which is fastened to the die slide by screws 86 so that it will take the slide along in both directions. Arm 84 is mounted so that a substantial space is left between arm and platen as indicated at 88 in Fig. 5.

Figure 3:
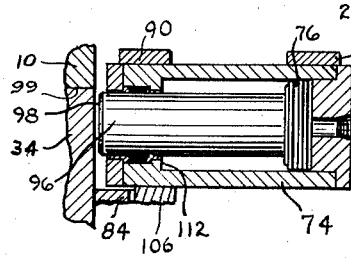
Fig. 3 is an enlarged section generally taken along line 3—3 of Fig. 2.

Cutting cylinder 74 is preferably of the hydraulic type and has legs 90 fastened by screws 92 to a bracket 94 welded to the platen 10. Piston rod 96 has a front face 98 arranged to contact slide 34 between arm 84 and platen 10 as shown in Fig. 3. As will be clear from the drawing, hydraulic unit 74, 76 is mounted so that its axis is disposed in the direction of the rectilinear path of travel of slide 34 and extends therefrom. Furthermore, the axis of the hydraulic unit 74, 76 passes through the annular cutting member or bolster 44 and preferably intersects the axis thereof so that the hydraulic unit will act substantially centrally upon the slide and bolster. At the same time, piston rod 96 is arranged to move along the adjacent face 99 (see Fig. 5) of platen 10 with little spacing so that the distance from the axis of piston rod 96 to the cutting plane of members 44, 46 is kept as small as possible.

A bracket 100 welded to the platen has a threaded opening therein receiving a screw 102 which is fixed in a desired position by means of a locknut 104 and serves as an adjustable stop to determine the inoperative position of slide 34 (see Figs. 4 and 5). Further, a bracket 106 is welded to the cutting cylinder 74 and carries a screw 108 and locknut 110 to form an adjustable stop determining the operative position of slide 34 (see Figs. 2 and 3), the end of screw 108 engaging the arm 84.

When it is desired to sever extruded material by means of cutting members 44, 46, the shifting cylinder 70 and cutting cylinder 74 are actuated preferably simultaneously so that through a predetermined distance they cooperate in shifting the slide 34 from its operative position towards the inoperative position. Piston rod 80 will act upon slide 34 through arm 84 while face 98 of piston rod 96 will contact and push the slide substantially centrally. The largest part of the required cutting force will be supplied by cylinder 74 having a correspondingly large capacity. When the cutting operation has been completed, that is, when cutting edge 54 has passed across cutting edge 56, the motion of piston rod 96 will be stopped, e. g., upon contact between piston 76 and a positive stop such as shoulder 112 (Fig. 3) of cylinder 74; however, slide 34 will continue to travel towards its inoperative position under the action of shifting cylinder 70 until stop screw 102 is engaged. Return of slide 34 to its operative position is effected by means of the double-acting shifting cylinder 70, the slide being stopped when arm 84 engages screw 108. Cutting cylinder 74 is preferably double-acting for returning piston 76 to its initial position but if desired, the slide 34 may be used to push piston rod 96 back into cylinder 74.

It will be clear from the above that the arrangement shown greatly facilitates operation of the press as only the cutting cylinder of relatively short stroke projects laterally from the press while the shifting mechanism of longer stroke is arranged substantially within the confines of the press proper. At the same time, power consumption is reduced since the cutting cylinder of relatively high capacity is inactive during certain idle slide movements which are carried out alone by the shifting cylinder of low capacity.

While a preferred embodiment of the invention has been described, it will be understood that various modifications and changes may be made without departing from the scope and spirit of the invention as defined in the appended claims. For example, while in the embodiment shown the shifting cylinder is attached to the lower guide member for the slide, it is in certain cases desirable to arrange the shifting cylinder above the slide. Instead of providing a positive stroke limit for the cutting piston, the latter may be controlled by limit switches which are adjustable so that motion of the piston may be restricted to the minimum required for a certain operation.

Having described our invention, what we claim and desire to secure by Letters Patent is:

1. In a metal extrusion press including a platen having an opening therethrough, a die slide movable along a rectilinear path across said opening to an operative position and an inoperative position and having a passage therethrough registering with said opening in the operative position of said slide, a die cooperating with said slide and adapted to register with said passage and opening for extruding metal therethrough, and cutting means carried by said slide for severing extruded metal from residue of metal in said die during movement of said slide, the combination comprising a first cylinder and piston unit disposed parallel to and alongside of said rectilinear path of travel and having a stroke sufficient for moving said slide to its operative and inoperative positions, and a second cylinder and piston unit having a shorter stroke and cooperating with the first unit for moving said slide during the cutting of extruded metal, the axis of said second cylinder and piston unit being disposed in the direction of said rectilinear path.

2. In a metal extrusion press including a platen having an opening therethrough, a die slide movable along a rectilinear path across said opening to an operative position and an inoperative position and having a passage therethrough registering with said opening in the operative position of said slide, a die cooperating with said slide and adapted to register with said passage and opening for extruding metal therethrough, and cutting means carried by said slide for severing extruded metal from residue of metal in said die during movement of said slide, the combination comprising a first cylinder disposed parallel to and alongside of said rectilinear path of travel, a first piston and piston rod operated by said first cylinder and having a stroke sufficient for moving said slide to its operative and inoperative positions, an arm secured to and connecting said first piston rod and said slide, a second cylinder with its axis disposed in the direction of said rectilinear path, and a second piston and piston rod operated by said second cylinder and having a stroke shorter than said stroke of the first piston and rod, said second piston rod having one free end to contact said die slide temporarily and cooperate with said first piston and rod in moving said slide during the cutting of extruded material.

(References on following page)

References Cited in the file of this patent

UNITED STATES PATENTS

| | | |
|---|---|---|
| 834,825 | Logan | Oct. 30, 1906 |
| 851,277 | Clark | Apr. 23, 1907 |
| 1,574,792 | Clark | Mar. 2, 1926 |
| 1,849,044 | Summey | Mar. 8, 1932 |
| 2,728,453 | Thweatt et al. | Dec. 27, 1955 |
| 2,738,063 | Billen | Mar. 13, 1956 |

FOREIGN PATENTS

| | | |
|---|---|---|
| 338,948 | Great Britain | Nov. 24, 1950 |
| 508,557 | Great Britain | June 30, 1939 |
| 1,054,873 | France | Oct. 14, 1953 |